E. BOOBYER & W. D. WILLIAMS.
CORN-SHELLING IMPLEMENT.
No. 184,826. Patented Nov. 28, 1876.
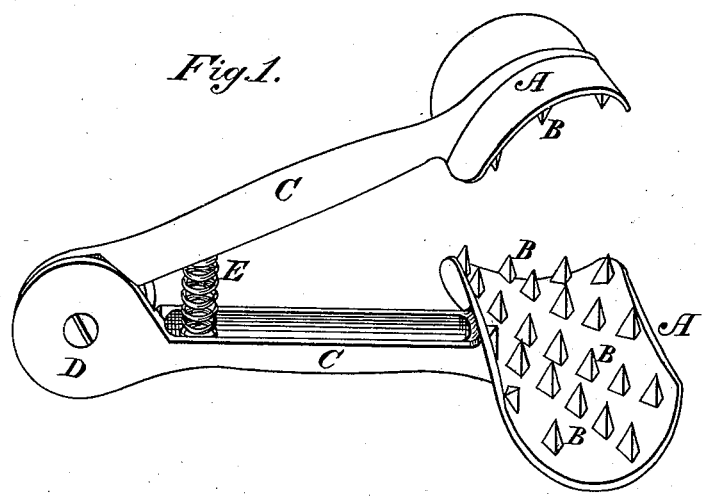
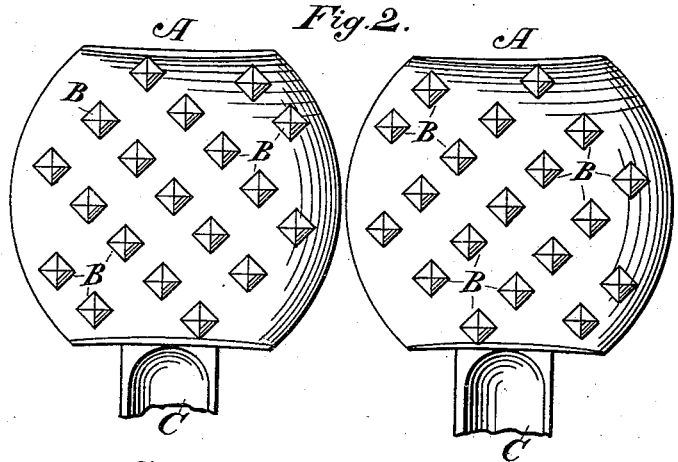
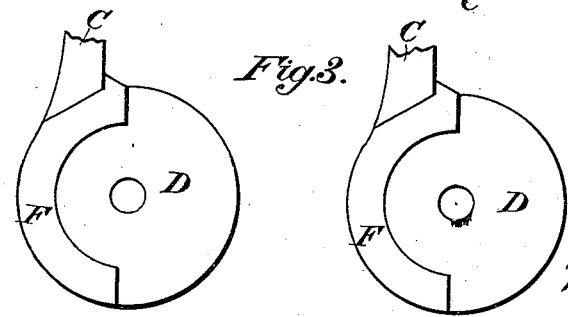
Attest:
John D. Roddy
J. Williams Jr
Inventors
Edward Boobyer
William D. Williams

UNITED STATES PATENT OFFICE.

EDWARD BOOBYER, OF SCOTT TOWNSHIP, ALLEGHENY COUNTY, AND WILLIAM D. WILLIAMS, OF ALLEGHENY, PENNSYLVANIA.

IMPROVEMENT IN CORN-SHELLING IMPLEMENTS.

Specification forming part of Letters Patent No. 184,826, dated November 28, 1876; application filed August 9, 1875.

*To all whom it may concern:*

Be it known that we, EDWARD BOOBYER and WILLIAM D. WILLIAMS, respectively of Scott township and Allegheny city, Allegheny county, and State of Pennsylvania, have invented certain Improvements in Hand Corn-Shellers, of which the following is a specification:

Our invention consists of an improvement in hand corn-shellers, formed by two circular jaws having diagonal ribs or teeth set in the inside. These jaws are fastened upon two arms of convenient length for handling, and are fastened together by a hinged joint.

The shelling-jaws A A are each made concave in form, the concavity being most contracted in the center and increasing in depth and width towards each side, so that the shelling-faces are convex in the line of the passage of the ear, and the opening left by them when placed together is widest at each end and smallest in the center. This construction enables the operator to run the instrument more readily up the ear of corn and keeps the grains from scattering. The ribs or teeth B, formed on the shelling-faces of jaws A A, run diagonally across the shelling-faces from right to left upon one jaw, and from left to right upon the other, so that they do not, as in the ordinary shelling implements of this type, form a spiral conductor for feeding up on the ear by the revolution of the jaws around it; but the action of one set counteracts that of the other.

D is the joint or pivotal connection of the arms C C, which carry the sheller. Each arm is formed at this point with a semicircular projection, F, concentric with the pivot, and is recessed for the reception of the other arm, so that when they are fitted together the semicircular projection of each arm fits within the recess of the other, bearing against it so as to form a firm hinged connection between the arms; also, a guide and stop. The spring E keeps the jaws apart for the more convenient insertion of an ear of corn between them. The ear, being inserted between the jaws, is shelled in the same manner, and by the same manipulations, as in the case of other shelling implements of this type.

Figure 1 is a perspective view of the corn-sheller; Fig. 2, the two shelling-jaws A A, with the diagonal teeth; Fig. 3, the joint D, with the semicircular projections F.

We claim as novel and of our invention—

The concave shelling-jaws A A, formed with their shelling-faces convex in the line of passage of the ear, each face having formed upon it the diagonal ribs or teeth B, running in corresponding directions, substantially as and for the purpose set forth.

EDWARD BOOBYER.
WILLIAM D. WILLIAMS.

Witnesses:
JOHN D. RODDY,
T. WILLIAMS, Jr.